April 24, 1928.                                                 1,667,517
F. H. HAUSLEITER
METAL FRAMED HALF TONE SCREEN AND METHOD OF
FORMING THE METAL FRAME THEREON
Filed April 8, 1926
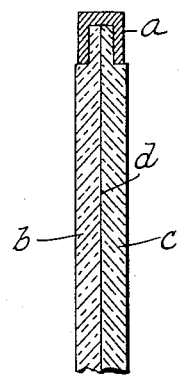
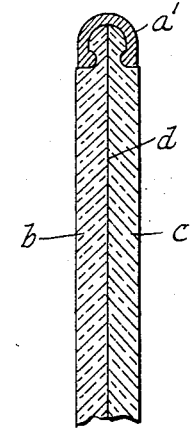
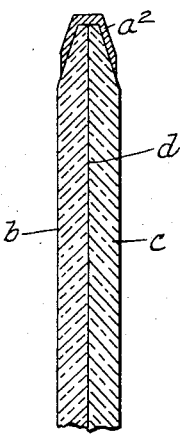
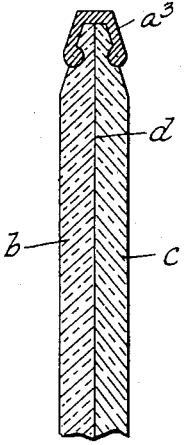
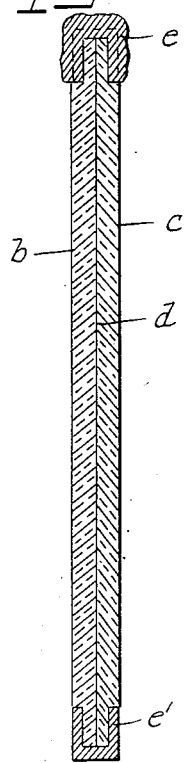
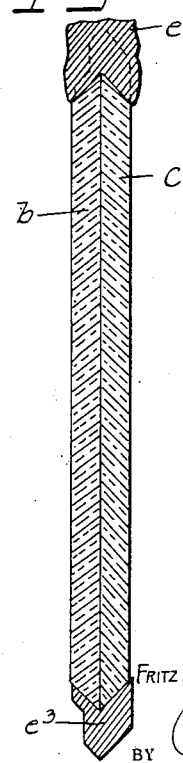
Fritz Hermann Hausleiter
INVENTOR
BY
his ATTORNEY Patented Apr. 24, 1928.

1,667,517

UNITED STATES PATENT OFFICE.

FRITZ HERMANN HAUSLEITER, OF MUNICH, GERMANY.

METAL-FRAMED HALF-TONE SCREEN AND METHOD OF FORMING THE METAL FRAME THEREON.

Application filed April 8, 1926, Serial No. 100,716, and in Germany December 5, 1925.

My invention relates to a method of forming metal frames on the edges of half-tone screens.

Half tone screens generally consist of two ruled plates of glass with the ruled faces superimposed and secured together by transparent cement. It is customary to additionally hold the plates together by a protective metal frame the parts of which are screwed together and attached by cement about two or more edges of the screen. The metal frame also assists in positioning and retaining the screen in a camera. The metal frame is manufactured separately from the screen and subsequently applied thereto.

Owing to the fact that glass and metal have different coefficients of expansion, and that it is generally difficult if not impossible to accurately fit the manufactured metal frame to the screen, it is not an uncommon experience for the screen to crack or become otherwise damaged when in use under certain temperature conditions.

It is also frequently necessary to repolish the screen after use and to permit this to be done it is essential to remove the metal frame from the glass, because the frame does not fit the glass accurately. In the repolishing operation, polishing blocks are employed which exert a powerful pull on the glass. To counteract this pull, frame members of wood or other yielding material are applied to the edges of the screen to firmly hold it on the polishing table. These frame members must be yielding as otherwise the strong pressure on the frames resulting from the powerful pull of the polishing blocks would disrupt the glass, and if the metal frames as now employed were permitted to remain on the screen during repolishing thereof, the glass would invariably shatter. The removal and replacement of the metal frame is a laborious and time consuming operation, requiring skill and causing considerable expense.

With the foregoing in view, the object of my invention is to provide a new form of screen frame and method of applying the same whereby the disadvantages of the frames as heretofore employed are eliminated and a greatly superior half tone screen is produced. I accomplish this object by forming the metal frame directly on the glass screen, as distinguished from existing methods in which the screen is formed separately, the frame formed separately and the latter then applied to the former.

In practicing my novel method I may apply the metal frame to the glass screen by any technical procedure according to which coherent metal is formed on a base or support, examples of this procedure being found in the deposition of metal on glass in mirror manufacture, the electrolytic deposit of metals or by spraying the metal onto a base.

The invention is illustrated in the accompanying drawing in which Figs. 1 to 4 are fragmentary edge views of half tone screens with different shaped metal frames, in section, applied to the screens in accordance with the present invention; Figs. 5 and 6 are edge elevations of screens each having at one edge an unshaped metal frame and at another edge the frame after being shaped so that the plane of the screen ruling may be properly positioned in the camera.

Referring to Figs. 1 to 4 of the drawing, $b$ and $c$ are the glass plates of a half tone screen the ruled faces $d$ of which are superimposed and cemented together. To two or more of the edges of such a screen I apply directly, by any of the methods above referred to, a metal frame which may be of any desired shape. In Fig. 1 the metal frame $a$ is rectangular in cross section, in Fig. 2 the metal frame $a'$ is curved with inturned enlarged ends, in Fig. 3 the metal frame $a^2$ is angular with its sides splayed, and in Fig. 4 the metal frame $a^3$ resembles generally the frame $a^2$ but has inturned enlarged ends somewhat like the frame $a'$.

In but a very small percentage of cases are the ruled faces of the half tone screen absolutely plane parallel, and when the ordinary screen is placed in the screen holder in the camera the outer face of the screen is generally parallel to the photographic plate but the cemented plane in which the rulings lie is not parallel to the photographic plate. The ordinary metal frame as heretofore used tends to accentuate this defect and while attempts have been made to overcome the difficulty by using perfectly plane parallel glass sheets, this has been successful only with very small screens and at greatly disproportionate expense while it has been entirely unsuccessful with large screens.

By means of my invention I am enabled to make the ruled surface of the screen practically mathematically accurately parallel with the plane of the photographic plate and I do this by shaping the metal frame, so that it is not necessarily the outer face of the screen which is parallel to the plate but the rulings which are parallel thereto.

This procedure is illustrated in Figs. 5 and 6. The plane of the ruled surfaces $d$ having been determined it can readily be ascertained how the metal frame should be formed to have the screen ruling positioned in perfect parallelism to the photographic plate. In Fig. 5 it is assumed that the metal frame should be rectangular in cross section and somewhat offset, and with this end in view metal $e$ somewhat greater in quantity than that needed for the finished frame is deposited on the edge of the screen and this metal is then worked and shaped until it assumes the form shown by $e'$. The metal frame of Fig. 6 is to be offset and stepped at one side, and the deposited metal $e^2$ is worked and shaped until the frame is given the final form indicated at $e^3$. It will be understood that the frame shapes shown in Figs. 5 and 6 are illustrative only and that in each instance the shape given the frame is that suited to the exigencies of the case.

I claim:—

1. In the herein described method of manufacturing half tone screens in which ruled plates are secured in superimposed relation, the step of forming a metal frame directly on the edge of the screen.

2. In the herein described method of manufacturing half tone screens in which ruled plates are secured in superimposed relation, the step of directly depositing metal on the edge of such screen.

3. In the herein described method of manufacturing half tone screens in which ruled plates are secured in superimposed relation, the steps of directly depositing metal on the edge of the screen and subsequently shaping the metal.

4. As a new article of manufacture, a half tone screen having a frame of metal directly formed on its edge.

In testimony whereof I hereunto affix my signature.

FRITZ HERMANN HAUSLEITER.